United States Patent [19]

Uematsu

[11] Patent Number: 5,479,230
[45] Date of Patent: Dec. 26, 1995

[54] IMPROVED MIRROR BOX CONSTRUCTION TO ENSURE ACCURATE ASSEMBLY THEREOF

[75] Inventor: Kimio Uematsu, Tokyo, Japan

[73] Assignee: Nikon Corporation, Tokyo, Japan

[21] Appl. No.: 190,842

[22] Filed: Feb. 3, 1994

[30]   Foreign Application Priority Data

Feb. 4, 1993   [JP]   Japan ................................ 5-017390

[51] Int. Cl.⁶ ............................................... G03B 19/12
[52] U.S. Cl. .................................................... 354/152
[58] Field of Search ................................. 354/152, 246, 354/288

[56]               References Cited

U.S. PATENT DOCUMENTS

| | | | |
|---|---|---|---|
| 4,163,612 | 8/1979 | Ueda et al. | 354/152 |
| 4,417,796 | 11/1983 | Sugiura et al. | 354/152 |
| 4,814,807 | 3/1989 | Nakagawa et al. | 354/246 |
| 5,150,141 | 9/1992 | Uematsu | 354/152 |
| 5,264,887 | 11/1993 | Fukahori | 354/152 X |
| 5,266,993 | 11/1993 | Uematsu | 354/246 |

FOREIGN PATENT DOCUMENTS 3-237444   10/1991   Japan .

*Primary Examiner*—Michael L. Gellner
*Assistant Examiner*—J. K. Han
*Attorney, Agent, or Firm*—Oliff & Berridge

[57]               ABSTRACT

A mirror box for a camera includes a mirror box section for rotatably holding a mirror, a lens mounting section for connection to a lens and a shutter plate section that defines an inlet opening for a shutter assembly, all three sections being defined as a one-piece unit. By this structure, the central axes of the lens mounting section, the shutter assembly and the mirror box coincide. This enables the operating position of the shutter assembly to be adjusted directly with respect to the light axis of the photographic lens.

20 Claims, 5 Drawing Sheets

IMPROVED MIRROR BOX CONSTRUCTION TO ENSURE ACCURATE ASSEMBLY THEREOF

BACKGROUND OF THE INVENTION

1. Field of the Invention

This invention is related to the structure of a mirror box to be installed in a camera.

2. Description of Related Art

FIG. 4 shows a focal plane shutter system 11, a mirror box 3 and the front panel component 1 of a conventional camera. These elements are formed as independent units prior to being assembled in the camera. A lens installation mount 2 is provided on the front panel component 1. The mirror box 3 is installed behind the front panel component 1 (i.e., on the film surface side of the front panel component).

The mirror box 3 includes a side board 4, and a side bottom board 5, with a movable mirror 6 being placed between the boards 4 and 5. A light shielding paper 7 and a light shielding board 8 also are placed within the mirror box 3. The boards 4 and 5 are connected by an upper fixture 10. A maintenance component 9 for the optical viewfinder is placed in the top of the mirror box.

The focal plane shutter system 11 is placed behind the mirror box 3 (i.e., the side of the mirror box closest to the film surface). The focal shutter system 11 includes a primary plate 12 and a secondary plate 13, which are spaced apart by a specified interval, the components facing one another. A group of shutter blades 14 made of several thin, light shielding boards are provided between the primary plate 12 and the secondary plate 13. A shutter blade driving mechanism 15, for moving the group of blades 14 is placed in front (i.e., on the lens side) of the primary plate 12.

FIG. 5 shows a shutter plate 16 (or primary plate) of the focal plane shutter system disclosed in Utility Model Publication No. 63-45540 and U.S. Pat. No. 4,814,807, the shutter plate 16 being made of resin. The shutter plate 16 has an opening and support shafts 17 for mounting the blade driving mechanism, which are created of resin into one unit. The positions of the support shafts 17 are determined based on the center of the opening provided in the shutter plate 16. The starting position of the shutter blades are determined relative to the position of the support shafts.

With conventional products, however, the shutter system 11, the mirror box 3 and the front panel component 1 are created as independent units, as detailed above. Each component has the potential for causing an error (e.g. an installation error) during the camera assembly process. Due to these errors, a shift may occur between the center of the opening of the shutter plate 16 and the actual photographic light axis after assembly. Because of this, even if the shutter running curve, which runs inside the openings, is measured at a certain position based on the center of the opening in the independent shutter system, and if the shutter driving springs etc. are adjusted based upon such measurements, if the starting position of the shutter blade is set to prevent uneven exposure (in other words, the position of the support is adjusted) a problem occurs that the starting position, observed from the actual light axis (i.e., the photographic lens light axis) after camera assembly, may cause uneven exposure when there has been a shift between the relative positions of the photographic lens and the shutter system after assembly.

It is desirable that the slit forming section of the shutter blade be created in parallel, but in reality a slight shift occurs during manufacturing. The effect of such a shift is negligible when using a wide slit width (in the case of slow speeds), but when using a narrow slit width (high speeds) the slit width nearly disappears in certain sections of the screen, and sufficient exposure does not occur (i.e., uneven exposure is caused in the horizontal direction of the screen). This phenomena is especially likely to occur during the interval between the start-up of the shutter blades and the establishment of stable blade velocity (i.e., during the period of unstable blade velocity). Because of this, when the starting position of the shutter blades is slightly separated from the aperture, the shutter blades run through the aperture during the unstable time, resulting in an uneven exposure at the top of the screen. In order to prevent this uneven exposure, the starting position of the shutter blade is appropriately adjusted in a well known manner. However, as detailed above, even when the shutter blade (specifically, its support shaft) is adjusted to be at a position so as to prevent uneven exposure prior to assembling the shutter system to the camera, there is always a problem of the starting position being shifted after the assembly of the camera to a position that causes uneven exposure, due to the reasons detailed above (i.e., due to installation error).

Furthermore, with conventional systems, at least one or all of the components comprised of the mounting seat, the mirror box, and the shutter plate are made of metal, resulting in an increase in the weight of the camera.

Moreover, in a conventional system, the mounting seat, the mirror box, and the shutter plate are independent components, causing the number of components to increase, with an accompanying increase in cost and longer assembly time.

SUMMARY OF THE INVENTION

An object of this invention is to provide a unit for use in a camera that simplifies the adjustment process by eliminating the possibility for errors after assembly of the camera.

In order to overcome the foregoing and other problems, and to achieve the above and other objects, a mirror box for a camera includes a first opening that defines a lens mount seat section, which determines the position of mounting of a photographic lens to a mirror box section, and, located on the mirror box section opposite to the lens mount seat section, a second opening that defines a shutter plate section. The second opening defines the primary (i.e., inlet) opening of a shutter assembly. The first and second openings are made on a single, one-piece section of the mirror box so as to define a one-piece unit. Accordingly, the central axes of the first opening (and attached photographic lens), the mirror box, and the second opening (and attached shutter assembly) coincide. The adjusting structure for adjusting the positions of the shutter blades of the shutter assembly are provided on the shutter plate section, which is one-piece with the mirror box section. Accordingly, the shutter blades are adjustable with respect to the light axis of the photographic lens. No misalignment can ever occur between the axis of the shutter assembly and the axis of the photographic lens.

The lens mount seat section, mirror box section and the shutter plate section are integrated as one unit in such a way that the position of the center of each section coincides with the light axis of the photographic lens. Moreover, the position of the position determining mechanism which determines the starting position of the shutter blades prior to exposure is determined based on the light axis of the photographic lens, eliminating the problem of uneven exposure within the photographic screen when taking a photograph.

Furthermore, the center of the movable mirror, the driving mechanism of the movable mirror, the position of the viewfinder optical component, the position of the shutter blades, and the position of the control mechanism relative to the light axis are completely manageable in one component. Hence, assembly errors are reduced and accuracy is increased.

BRIEF DESCRIPTION OF THE DRAWINGS

The invention will be described in detail with reference to the following drawings in which like reference numerals refer to like elements and wherein.

DETAILED DESCRIPTION OF PREFERRED EMBODIMENTS

Figure 2A:
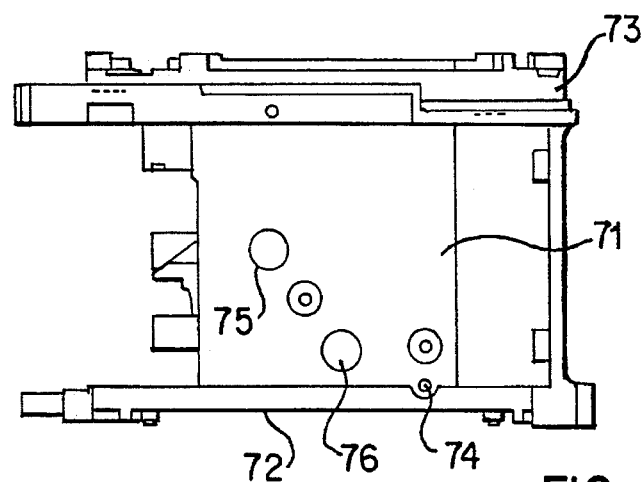
FIGS. 2A–2C show the main body of the mirror box according to the invention, with FIG. 2A being a side view of the film rewinding mechanism side, FIG. 2B being a back view, and FIG. 2C being a side view of the film winding mechanism side.
Figure 2B:
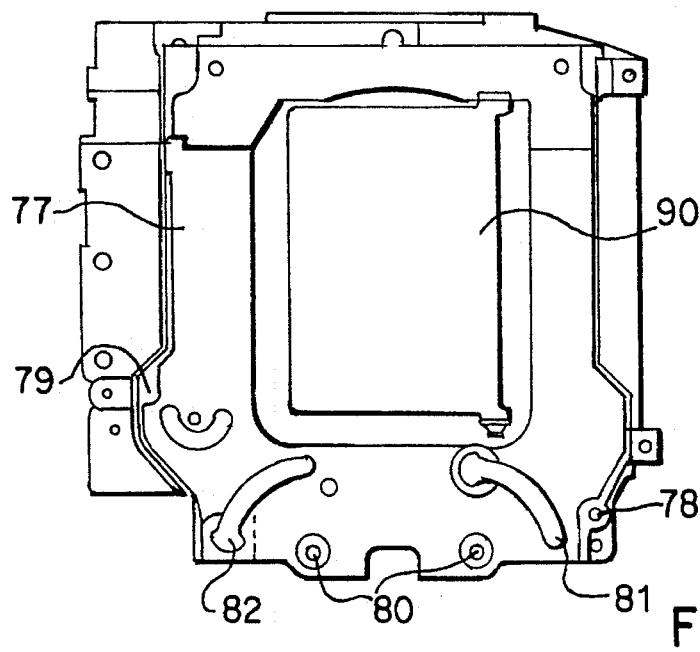
Figure 2C:
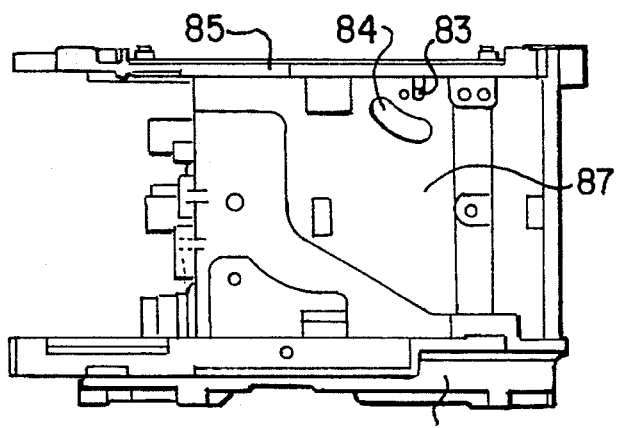
Figure 3:
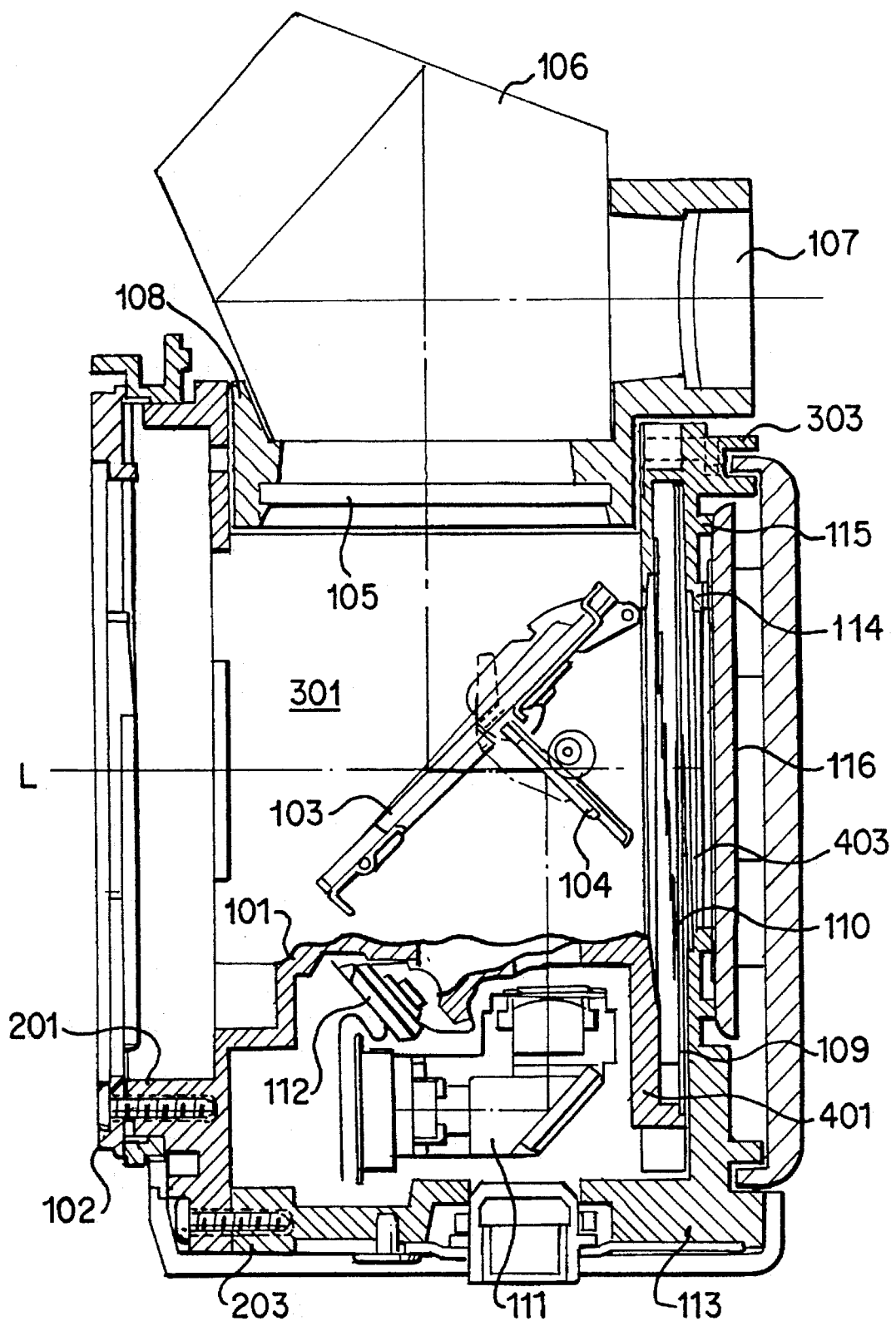
FIG. 3 is a cross-sectional view through the central light axis of the main body of a camera to which the mirror box of this invention is assembled.
Figure 4:
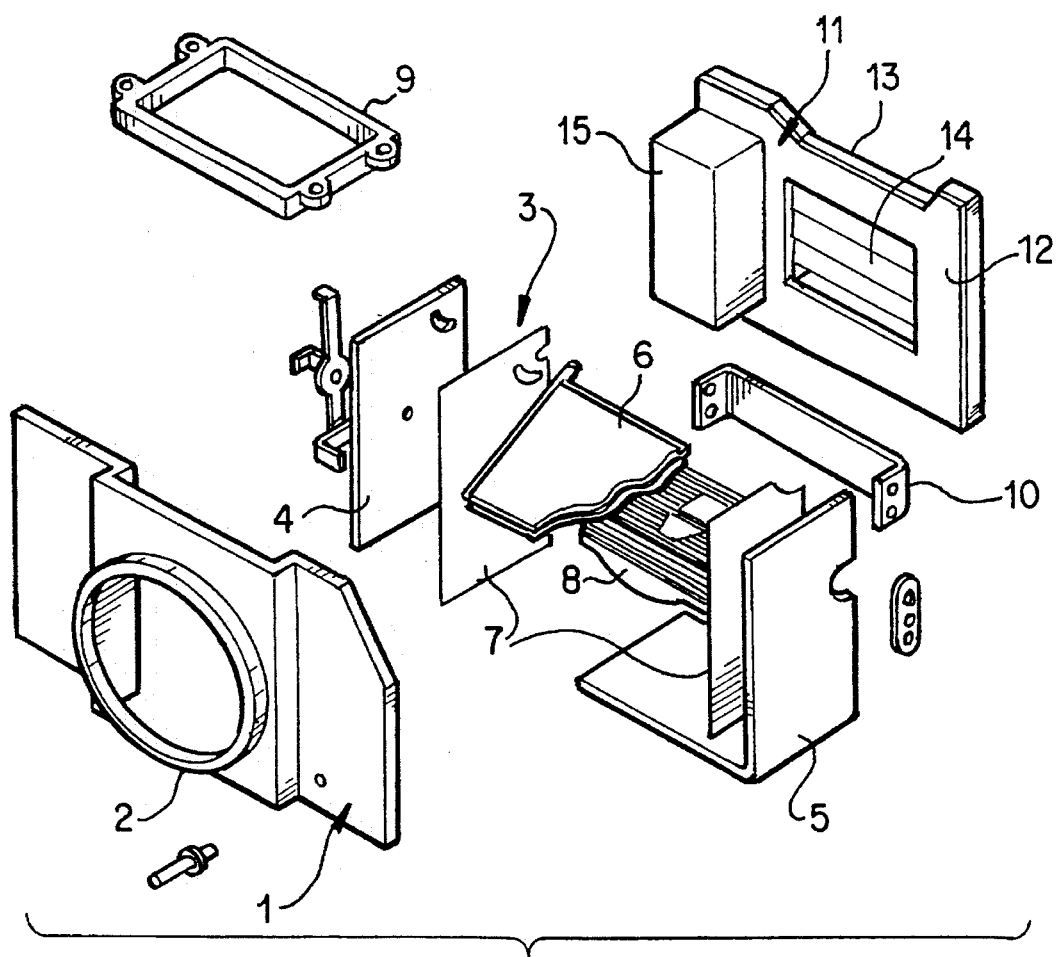
FIG. 4 is a perspective, exploded view showing a conventional focal plane shutter system.
Figure 5:
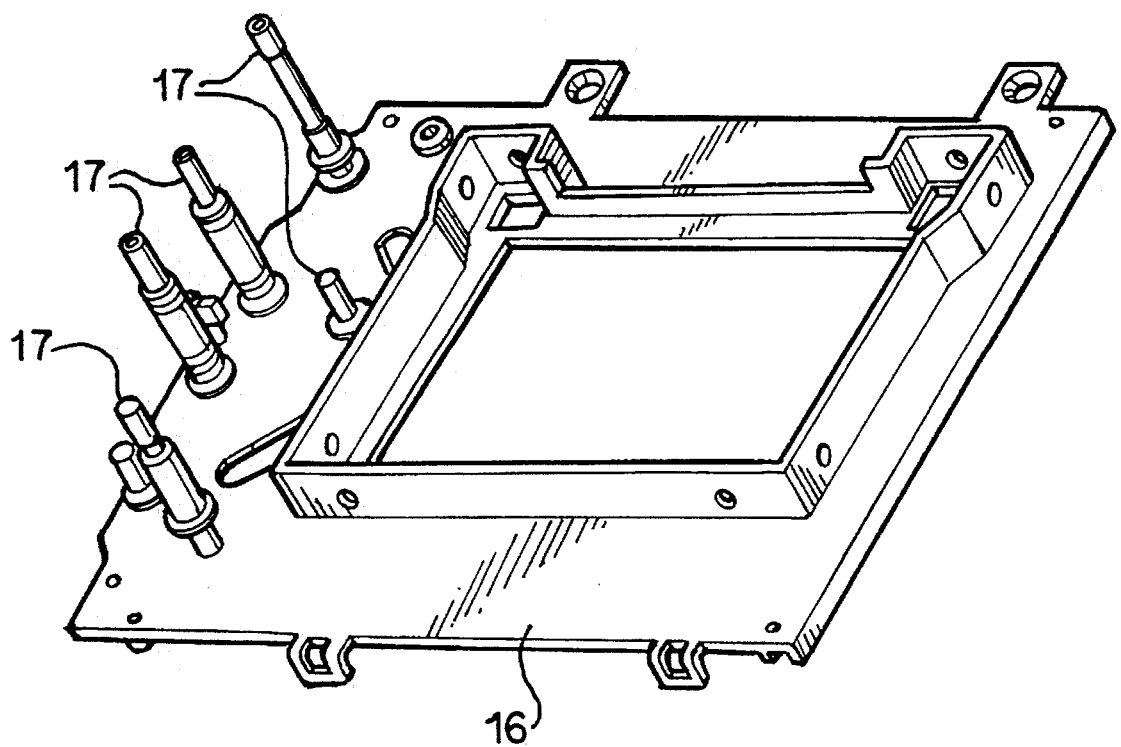
FIG. 5 is an oblique view showing a conventional primary plate.

FIGS. 1–3 show an embodiment of the main body of mirror box in accordance with this invention, which preferably is made of a resin material. The main body of the mirror box in this description refers to a unit containing the mirror box section, the shutter plate section and the lens mount seat section.

FIGS. 1A–1C and FIGS. 2A–2C are views of the main body of the mirror box from all six sides. In this example, the main body of the mirror box is created as a unit in such a way that the central position of the lens mount section, the central position of the mirror box section and the central position of the inlet opening (to be explained later) provided in the shutter plate section coincide.

Figure 1A:
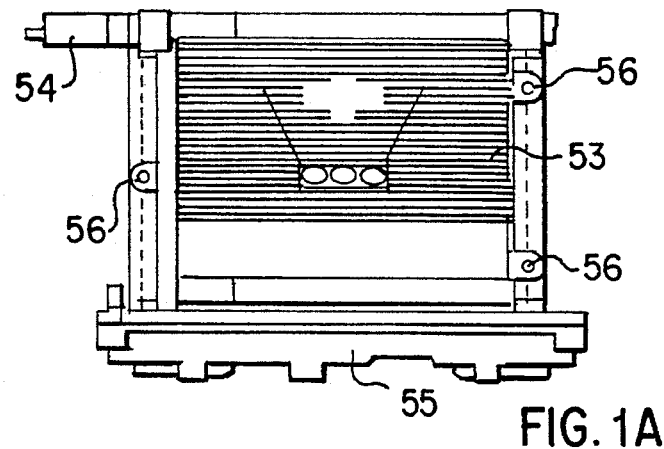
FIGS. 1A–1C show the main body of a mirror box according to the invention, with FIG. 1A being a top view, FIG. 1B being a front view, and FIG. 1C being a bottom view.

FIG. 1A is a top view of the main body of the mirror box. Inside of the mirror box section 53, the side as well as the bottom surfaces are equipped with light shielding lines as shown in the drawing. Furthermore, a movable mirror (not shown) and a sub mirror (not shown) are placed inside the mirror box section. In the rear portion of the mirror box section 53, the top surface 54 of a shutter plate, which is integrated with the mirror box, is shown. In the front portion of the mirror box section, the top surface 55 of the lens mount seat section, which is integrated in the mirror box, is shown. The top surface 56 of the mirror box is a surface on which a prism box (not shown) and a component of the viewfinder optic system, is secured.

Figure 1B:
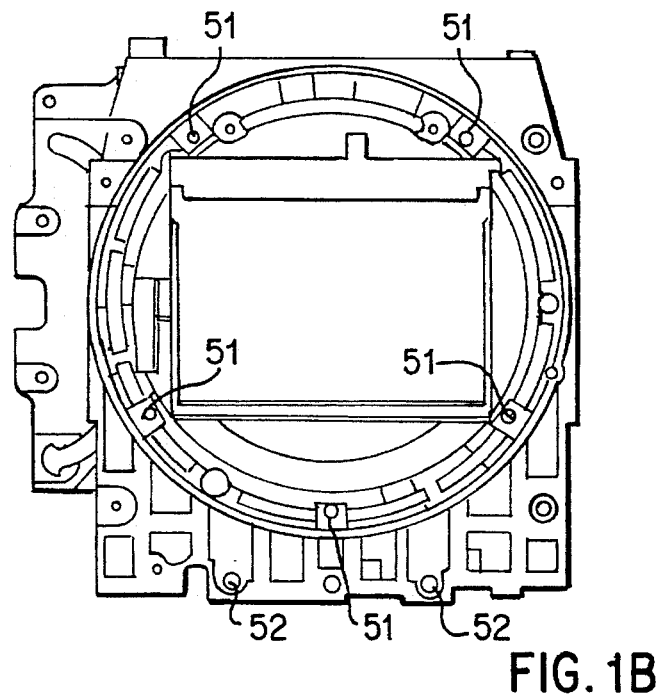

FIG. 1B is a front view of the main body of the mirror box, which includes the lens seat surface 51 to which can be secured the Bayonet mount (not shown) to which a photographic lens is mounted. A machine screw hole 52, which becomes the connecting point with the main body of the mirror box, is provided in the lower portion below the seat surface 51. The Bayonet mount is securely positioned on the seat surface 51 by screwing a machine screw, for example, into the machine screw hole 52.

Figure 1C:
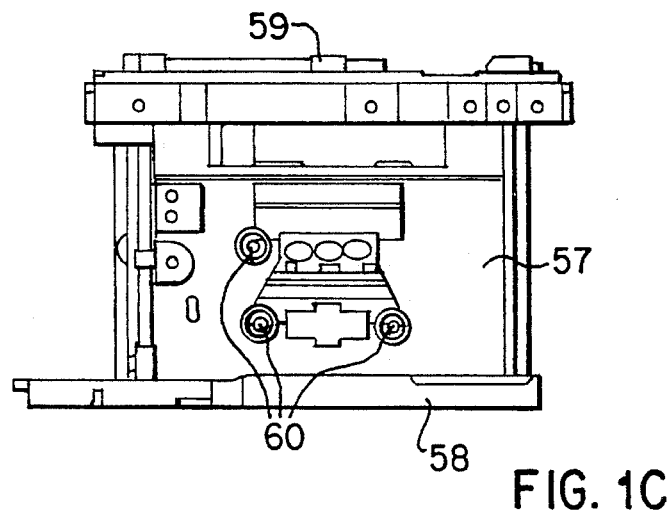

FIG. 1C is the bottom view of the main body of the mirror box. The bottom surface 58 of the shutter plate section, which is integrated with the mirror box section as a single unit, and the bottom surface 59 of the lens mount seat unit, which also is integrated with the mirror box as a single unit, are shown. Furthermore, pillars 60, to which a distance measuring sensor module (not shown) is secured, is shown in the bottom surface 57 of the mirror box.

FIG. 2A is a view of the side of the main body of the mirror box in which the film rewinding mechanism (not shown) is located. The side surface 72 of the shutter plate section is located at one side of the side surface 71 of the mirror box section, while the side surface 73 of the lens mount seat section is located at the other side, thus forming a unit with the side surface 71 of the mirror box. A hole 74 to which the shaft of the movable mirror is attached, a hole 75 to which a receiving pin enters during the down time of the movable mirror, and a hole 76 to which the receiving pin of the sub mirror enters, are provided in the side surface 71 of the mirror box section.

FIG. 2B is a view of the back surface of the main body of the mirror box. The shutter plate 77 forms an inner surface of the blade chamber in which the shutter blades are stored. The blade chamber is comprised of camera body 113, explained later with reference to FIG. 3, shutter plate 77, and a cover plate (not shown), which is attached to the surfaces 78 and 79. Also provided on shutter plate 77 are screw holes 80 (explained later) to which the center shaft (not shown) that rotates the shutter blades (not shown) is inserted, and long grooves 81 and 82 in which are located driving levers (not shown) that drive the shutter blades.

The shutter blade driving levers are assembled in the shutter control section (not shown), which is placed on the surface of the shutter plate 77, and operate jointly with a blade arm (not shown) in the blade chamber to move the blades up and down. The mechanism and the relationship of the joint motion of the blades, blade driving lever, blade arm and shutter control section are well known and therefore are not described in detail herein. The opening 90 provided in the central section of the shutter plate 77 is formed slightly larger than the aperture of the camera body that determines the photographic screen size.

The position of the screw holes 80 are determined, based on the photographic mount, to be at a location that does not cause the shutter blades to run inside the opening from the time the shutter blades begin running until a specified time (e.g., a time when they reach a stable speed), and which does not cause uneven exposure during the time the blades run inside the opening, as is well known.

FIG. 2C is a side view of the side of the main body of the mirror box in which a film winding mechanism (not shown) is located. A movable mirror driving mechanism (not shown) and the shutter blade driving section are placed on this side of the mirror box. A hole 83 into which the shaft of the movable mirror is inserted, and a hole 84 into which a protrusion section located on the side of the movable mirror is inserted are provided on the winding side 87 of the mirror box. The movable mirror is driven by the joint motion of the protrusion of the side of the movable mirror and the mirror raising lever of the mirror driving mechanism. The shutter driving mechanism is placed on a surface of the shutter plate section 85. The shutter plate section 85 is composed of a cover plate (not shown) and the shutter blade chamber. The vertical motion of the front shutter blades and the back shutter blades inside shutter blade chamber creates the exposure for a specified amount of time. The side surface 86 of the mounting seat section on which the Bayonet mount is attached also is shown, with the photographic lens being mounted on the Bayonet mount.

FIG. 3 is a central cross-sectional view of the main body of the camera in which the main body of the mirror box of this invention is assembled. The main mirror 103 and a sub mirror 104 are placed within the mirror box section 301 of the main body 101 of the mirror box. Light from the object is lead to the eye point through viewfinder optical system (screen 105, pentaprism 106, eye contact lens 107). The viewfinder optical system is assembled in the prism box 108 and is secured on the top surface of the mirror box through prism box 108.

The Bayonet mount 102 is secured on the mounting seat section 201.

The cover plate 109 and the shutter plate section 401 comprise the blade chamber in which the shutter blades 110 move vertically.

The center of the light axis of the photographic lens (not shown), the central position of the lens mount section (i.e., central position of the opening of the lens mount section), the central location of the mirror box section and the central position of the opening provided in the shutter plate section all coincide, as shown in FIG. 3.

A distance measuring sensor module 111 to which light from the object is lead through sub mirror 104, and which detects the amount of de-focus, is placed at the lower portion of the mirror box section. The light receiving elements 112 that determine the amount of light from the strobe by receiving the light reflected from the photographic light (primarily the strobe light) cast upon the film surface also is placed in the lower portion of the mirror box section.

All of the above components are assembled in the main body of the mirror box, each component being secured onto the main body of the camera.

The main body of the camera is formed into an L-shape. The components to be installed onto the mirror box are secured thereto at four places: the lower section 203 of the mounting seat, the upper section 303 of the mirror box, and two places in the direction of the length of the camera on each side of the light axis.

An opening 403 that defines the size of the photographic screen is provided in the main body of the camera 113. An inner rail 114 and an outer rail 115 are formed above and below opening 403. The film is positioned between the inner rail and a pressure plate 116, which form a passage. Pressure plate 116 touches outer rail 115.

With this embodiment, the Bayonet mount and the lens mount seat section integrated in the mirror box section are created separately. However, this invention is not limited to such a configuration. For example, a more compact configuration can be provided by creating the Bayonet mount and mounting seat section as one unit (which is integral with the mirror box) or the camera can be made in such a way that the lens is mounted directly on the lens mount seat.

As detailed above, with this invention, the lens mounting seat, mirror box and shutter plate are created as one unit (i.e., as one piece) with the center of each component coinciding with the light axis of the photographic lens. The running position of the shutter mechanism is made to be adjustable with respect to the light axis of the photographic lens (because the running position is adjusted using apertures 80 provided in the shutter plate 77 of the mirror box). Thus, with this invention, the shutter time and uneven exposure are controlled based on the photographic lens light axis. With this invention, the accuracy needed when taking a photograph is easily provided during the initial assembly phase, thus eliminating concerns about the possibility of uneven exposure when taking a photograph.

Furthermore, because with this invention the major components of the optical system of the camera are formed into a single unit, the accuracy associated with the positioning of the optical components is increased and the process for adjusting combined errors is simplified. Moreover, the cost is reduced and the camera assembly work is simplified due to the smaller number of components to be assembled.

Furthermore, it is preferable that the mirror box section, the shutter plate section and the mounting seat section are all plastic, resulting in a weight reduction of the camera.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A mirror box for a camera comprising:

a mirror box section including a connector that rotatably holds a mirror;

said mirror box section including first and second oppositely facing surfaces, formed on a single piece of material, and located on oppositely facing sides of said mirror box section;

said first surface of said mirror box section including a lens mount section having a first opening that defines a photographic lens light axis; and said second surface of said mirror box section defining a shutter plate section having a second opening that is aligned with said first opening and defines a central axis of a shutter assembly.

2. The mirror box of claim 1, wherein said single piece of material is a resin material.

3. The mirror box of claim 1, wherein said shutter plate section includes position determining structure for adjusting a position of shutter blades of a shutter assembly attached to said shutter plate section.

4. The mirror box of claim 3, wherein said position determining structure is a hole in said second surface of said mirror box section.

5. The mirror box of claim 1, wherein said first opening of said lens mount section is circular.

6. The mirror box of claim 1, wherein said lens mount section includes a bayonet connector.

7. The mirror box of claim 1, wherein said photographic lens light axis coincides with said central axis of said shutter assembly.

8. A mirror box for a camera comprising:

a one-piece mirror box housing including means for rotatably holding a mirror;

said one-piece mirror box housing including first and second oppositely facing surfaces located on oppositely facing sides of said mirror box housing;

said first surface of said mirror box including a first opening that defines a photographic lens light axis and photographic lens mounting means for attaching a photographic lens to said first surface; and said second surface of said mirror box having a second opening that is aligned with said first opening and defines a central axis of a shutter assembly, said second surface including shutter blade position determining means for adjusting a position of shutter blades of a shutter assembly attached to said second surface.

9. The mirror box of claim 8, wherein said one-piece mirror box housing is made from a resin material.

10. The mirror box of claim 8, wherein said shutter blade position determining means is a hole in said second surface of said one-piece mirror box housing.

11. The mirror box of claim 8, wherein said first opening in said first surface is circular.

12. The mirror box of claim 8, wherein said photographic lens mounting means includes a bayonet connector.

13. The mirror box of claim 8, wherein said photographic lens light axis coincides with said central axis of said shutter assembly.

14. A mirror box for a camera comprising:

a lens mount plate having a first opening that defines a photographic lens light axis;

a shutter plate having a second opening that defines a central axis of a shutter assembly;

a combination member extending between said lens mount plate and said shutter plate on opposite sides of said lens mount plate and said shutter plate, said combination member rotatably supporting a mirror;

said lens mount plate, said shutter plate, and said combination member being of one-piece construction.

15. The mirror box of claim 14, wherein said lens mount plate, said shutter plate, and said combination member are made from a single piece of resin material.

16. The mirror box of claim 14, wherein said shutter plate includes position determining structure for adjusting a position of shutter blades of a shutter assembly attached to said shutter plate.

17. The mirror box of claim 16, wherein said position determining structure is a hole in said shutter plate.

18. The mirror box of claim 14, wherein said first opening of said lens mount plate is circular.

19. The mirror box of claim 14, wherein said lens mount plate includes a bayonet connector surrounding said first opening.

20. The mirror box of claim 14, wherein said photographic lens light axis coincides with said central axis of said shutter assembly.

* * * * *